(12) United States Patent
Watarai et al.

(10) Patent No.: US 8,277,346 B2
(45) Date of Patent: Oct. 2, 2012

(54) LOW PROFILE REAR DERAILLEUR

(75) Inventors: Etsuyoshi Watarai, Izumi (JP); Satoshi Shahana, Osaka (JP); Sota Yamaguchi, Sakai (JP)

(73) Assignee: Shimano, Inc., Sakai (JP)

( * ) Notice: Subject to any disclaimer, the term of this patent is extended or adjusted under 35 U.S.C. 154(b) by 376 days.

(21) Appl. No.: 11/307,941

(22) Filed: Feb. 28, 2006

(65) Prior Publication Data

US 2007/0202977 A1 Aug. 30, 2007

(51) Int. Cl.
*B62M 9/12* (2006.01)

(52) U.S. Cl. .......................................................... 474/82

(58) Field of Classification Search .................... 474/80, 474/82; B62M 9/12
See application file for complete search history.

(56) References Cited

U.S. PATENT DOCUMENTS

| | | |
|---|---|---|
| 534,680 A | 2/1895 | Bolte |
| 2,507,416 A | 5/1950 | Needham |
| 3,364,762 A | 1/1968 | Maeda |
| 3,535,950 A | 10/1970 | Shimano et al. |
| 3,677,103 A | 7/1972 | Huret et al. |
| 3,702,080 A | 11/1972 | Huret et al. |
| 3,803,933 A | 4/1974 | Huret et al. |
| 3,979,962 A | 9/1976 | Kebsch |
| 4,061,048 A | 12/1977 | Huret et al. |
| 4,226,131 A | 10/1980 | Yamasaki |
| 4,269,601 A | 5/1981 | Nagano |
| 4,277,077 A | 7/1981 | Ozaki ........................ 280/236 |
| 4,286,953 A | 9/1981 | Shimano ........................ 474/80 |
| 4,306,871 A | 12/1981 | Nagano |
| 4,406,643 A | 9/1983 | Shimano |
| 4,437,848 A | 3/1984 | Shimano |
| 4,443,208 A | 4/1984 | Kozakae |
| 4,470,823 A | 9/1984 | Shimano |
| 4,530,677 A | 7/1985 | Nagano |
| 4,552,546 A | 11/1985 | Ishikawa |
| RE32,059 E | 12/1985 | Nagano |
| 4,637,808 A | 1/1987 | Nakamura |
| 4,734,084 A | 3/1988 | Nagano |
| 4,758,205 A | 7/1988 | Durham |
| 4,789,379 A | 12/1988 | Ozaki et al. |
| 4,838,837 A | 6/1989 | Testa |

(Continued)

FOREIGN PATENT DOCUMENTS

BE 425459 A 12/1937

(Continued)

OTHER PUBLICATIONS

European search report for EP 06022723.8, a European application related to this application, dated Jul. 30, 2007.

(Continued)

*Primary Examiner* — Robert A Siconolfi
*Assistant Examiner* — Anna Momper
(74) *Attorney, Agent, or Firm* — James A. Deland

(57) ABSTRACT

A bicycle rear derailleur comprises a base member; a movable member that supports a chain guide including a first pulley that rotates around a first pulley axis, wherein the pulley has a pulley plane; and a first linking member coupled between the base member and the movable member so that the chain guide moves laterally relative to the base member between a first lateral position and a second lateral position. The pulley plane intersects the first linking member when the chain guide is located at a first position between the first lateral position and the second lateral position.

85 Claims, 12 Drawing Sheets

U.S. PATENT DOCUMENTS

| | | | |
|---|---|---|---|
| 5,163,881 A | | 11/1992 | Chattin |
| 5,238,458 A | * | 8/1993 | Ishibashi .......................... 474/82 |
| 5,295,916 A | | 3/1994 | Chattin |
| 5,346,434 A | * | 9/1994 | Hsu ................................ 474/82 |
| 5,380,252 A | | 1/1995 | Iwasaki et al. |
| 5,380,253 A | | 1/1995 | Iwasaki |
| 5,445,567 A | | 8/1995 | Chattin |
| 5,456,637 A | | 10/1995 | Chang |
| 5,518,456 A | * | 5/1996 | Kojima et al. .................. 474/77 |
| 5,597,366 A | * | 1/1997 | Ozaki ............................. 474/82 |
| 5,618,241 A | * | 4/1997 | Ose ................................ 474/80 |
| 5,624,334 A | | 4/1997 | Lumpkin |
| 5,688,200 A | | 11/1997 | White |
| 5,779,580 A | | 7/1998 | White et al. |
| 5,855,529 A | | 1/1999 | Sugimoto |
| 5,857,932 A | | 1/1999 | Sugimoto |
| 5,904,629 A | | 5/1999 | Oka |
| 6,015,360 A | | 1/2000 | Chang |
| 6,030,307 A | | 2/2000 | Oka |
| 6,135,905 A | | 10/2000 | Soon |
| 6,287,228 B1 | | 9/2001 | Ichida |
| 6,315,688 B1 | | 11/2001 | McLaughlin et al. |
| 6,325,733 B1 | | 12/2001 | Patterson et al. |
| 6,354,971 B1 | | 3/2002 | Howell et al. |
| 6,419,602 B1 | | 7/2002 | Soon |
| 6,692,389 B2 | | 2/2004 | Yin |
| 6,793,598 B1 | | 9/2004 | Savard |
| 7,014,584 B2 | | 3/2006 | Nanko et al. |
| 7,104,908 B2 | | 9/2006 | Nagano |
| 7,396,304 B2 | | 7/2008 | Shahana |
| 2004/0106482 A1 | | 6/2004 | Nagano |
| 2004/0116222 A1 | * | 6/2004 | Shahana et al. ................. 474/82 |
| 2004/0254038 A1 | | 12/2004 | Chamberlain et al. |
| 2005/0176537 A1 | * | 8/2005 | Matsumoto et al. ............ 474/80 |
| 2005/0187048 A1 | * | 8/2005 | Fukuda ........................... 474/70 |
| 2005/0192138 A1 | | 9/2005 | Sze et al. |
| 2005/0215368 A1 | * | 9/2005 | Hoe ................................ 474/80 |
| 2007/0021246 A1 | | 1/2007 | Shahana et al. |
| 2007/0202977 A1 | | 8/2007 | Watarai et al. |
| 2007/0202978 A1 | | 8/2007 | Yamaguchi et al. |
| 2008/0064544 A1 | | 3/2008 | Yamaguchi et al. |
| 2008/0064545 A1 | | 3/2008 | Yamaguchi |
| 2008/0081716 A1 | | 4/2008 | Watarai et al. |

FOREIGN PATENT DOCUMENTS

| | | |
|---|---|---|
| CH | 284668 A | 11/1952 |
| CN | 1133806 A | 10/1996 |
| CN | 1133807 A | 10/1996 |
| CN | 2252764 Y | 4/1997 |
| DE | 4022743 A1 | 1/1992 |
| DE | 9422229 U1 | 5/1999 |
| DE | 19915334 A1 | 10/2000 |
| EP | 0032049 A2 | 7/1981 |
| EP | 0513394 A1 | 11/1992 |
| EP | 0542077 A1 | 5/1993 |
| EP | 0655386 A1 | 5/1995 |
| EP | 718185 A2 | 6/1996 |
| EP | 1010612 A1 | 6/2000 |
| EP | 1099620 A2 | 5/2001 |
| EP | 1475300 A2 | 11/2004 |
| EP | 1486407 A2 | 12/2004 |
| EP | 1671881 A2 | 6/2006 |
| EP | 1764297 A1 | 3/2007 |
| FR | 760565 A | 2/1934 |
| FR | 799947 A | 6/1936 |
| FR | 869777 | 2/1942 |
| FR | 922775 | 6/1947 |
| FR | 1000094 | 2/1952 |
| JP | 50-47153 | 5/1975 |
| JP | 54-9853 | 1/1979 |
| JP | 54-47247 A | 4/1979 |
| JP | 54-47248 A | 4/1979 |
| JP | 54-57736 A | 5/1979 |
| JP | 54-72831 A | 6/1979 |
| JP | 55-29695 A | 3/1980 |
| JP | 55-127272 A | 10/1980 |
| JP | 55-140678 A | 11/1980 |
| JP | 55-148676 A | 11/1980 |
| JP | 62-99291 A | 5/1987 |
| JP | 8-169387 A | 7/1996 |
| WO | 92-10395 A1 | 6/1992 |

OTHER PUBLICATIONS

European search report for EP 06004024.3, the European application that corresponds to this application, dated Jun. 14, 2006.

Extended European search report for EP 06022723.8, a European application related to this application, dated Aug. 6, 2007.

European search report for EP 06026059.3, now published as EP 1826115 A2, the European application that is equivalent to U.S. Appl. No. 11/423,247, an application related to this application, dated Dec. 14, 2007.

European search report for EP 06026059.3, now published as EP 1826115 A2, the European application that is equivalent to U.S. Appl. No. 11/423,247, an application related to this application, dated Feb. 13, 2008.

European search report for EP 07007210.3, now published as EP 1916183 A2, the European application that is equivalent to U.S. Appl. No. 11/552,291, an application related to this application, dated Apr. 16, 2008.

European search report for EP 08161785.4, now published as EP 2000399 A1, the European application that corresponds to original claims 36-46 of this application, dated Oct. 14, 2008.

Taiwanese office action and search report for TW 095137042, the Taiwanese application that corresponds to co-pending related U.S. Appl. No. 11/423,247, dated Feb. 16, 2009.

Taiwanese office action and search report for TW 095132098, the Taiwanese application that corresponds to this application, dated Feb. 18, 2009.

European Search Report and office action for EP 07022964.6, the European application that corresponds to co-pending related U.S. Appl. No. 11/747,460, dated Jun. 2, 2009.

European Search Report and office action dated Jun. 17, 2009, for EP 09154602.8, a divisional of EP 06026059.3, now published as EP 1826115 A2. EP 1826115 A2 is the European application that corresponds to co-pending related U.S. Appl. No. 11/423,247.

European Search Report for EP 08003740.1 (now published as EP 1939085 A2), dated Aug. 14, 2009. EP 1939085 is the European application that corresponds to claims 1-45 of co-pending related U.S. Appl. No. 11/963,712.

Winkler, et al.; "Fahrradtechnik," pp. 1,2 and 269, published in 1989 by Bielefelder Verlagsanstalt KG in Germany.

Notice of Opposition filed Mar. 9, 2011 against EP 1826114 B1, the European patent that pertains to claims 1-46, 71-83 and 93 of this application.

EPO search report and office action dated Feb. 28, 2011 for EP 10183792.0, a divisional application from the EP application that corresponds to this application.

EPO office action dated Jun. 28, 2010 for EP 07007210.3, the EP application that corresponds to co-pending U.S. Appl. No. 11/552,291.

* cited by examiner

US 8,277,346 B2

LOW PROFILE REAR DERAILLEUR

BACKGROUND OF THE INVENTION

The present invention is directed to bicycles and, more particularly, to a low profile rear derailleur used to switch a chain among a plurality of sprockets that rotate with the rear wheel.

A bicycle rear derailleur is used to selectively engage a chain with one of a plurality of sprockets that rotate with the rear wheel of the bicycle. A typical rear derailleur comprises a base member, a movable member supporting a chain guide, and a linking mechanism coupled between the base member and the movable member so that the chain guide moves laterally relative to the base member. The base member usually is mounted to the rear end of the bicycle frame by a mounting bolt that screws into a threaded opening formed in the frame. Because of the nature of the lateral movement of the chain guide required to switch the chain among the sprockets, the linking mechanism, the movable member and the chain guide all protrude laterally outward by a significant distance, especially when the chain is engaged with the laterally outermost rear sprocket. As a result, the chain guide is susceptible to striking or becoming entangled with nearby objects, especially when riding off-road in mountainous terrain. The effect becomes more severe as the number of sprockets increase.

SUMMARY OF THE INVENTION

The present invention is directed to various features of a bicycle rear derailleur. In one embodiment, a bicycle rear derailleur comprises a base member; a movable member that supports a chain guide including a first pulley that rotates around a first pulley axis, wherein the pulley has a pulley plane; and a first linking member coupled between the base member and the movable member so that the chain guide moves laterally relative to the base member between a first lateral position and a second lateral position. The pulley plane intersects the first linking member when the chain guide is located at a first position between the first lateral position and the second lateral position. Additional inventive features will become apparent from the description below, and such features alone or in combination with the above features may form the basis of further inventions as recited in the claims and their equivalents.

DETAILED DESCRIPTION OF THE EMBODIMENTS

Figure 1:
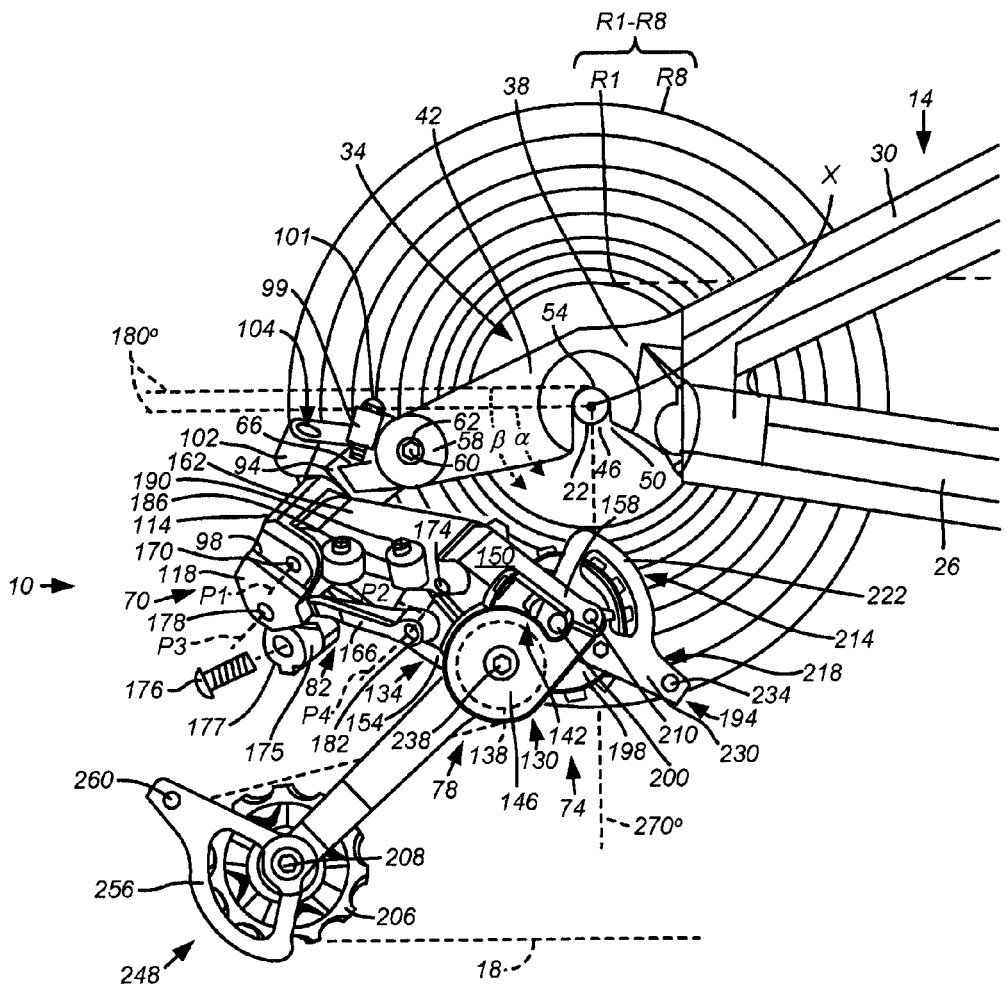
FIG. 1 is a laterally outer view of a particular embodiment of a rear derailleur in a high speed position.
Figure 2:
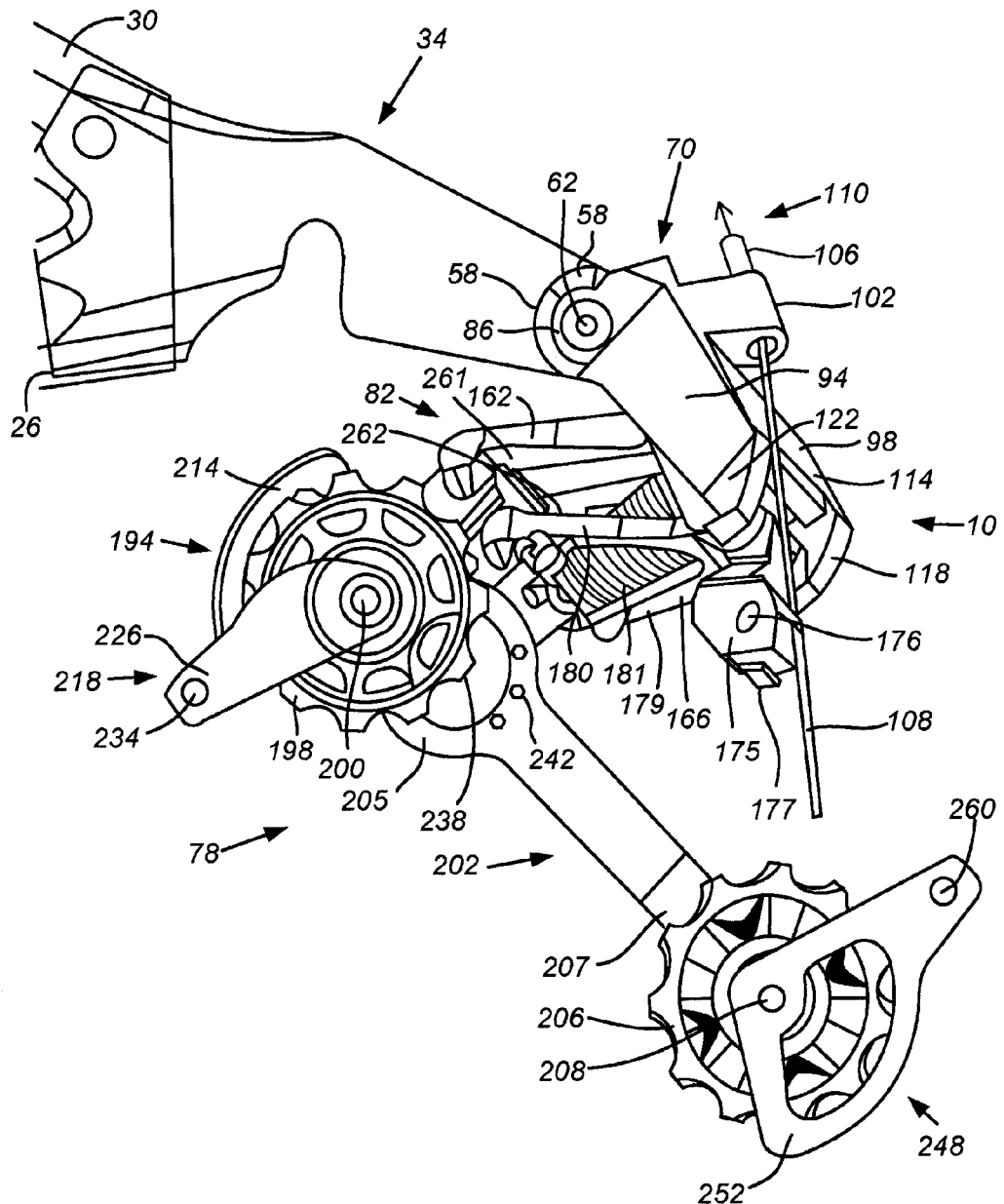
FIG. 2 is a laterally inner view of the derailleur.
Figure 3:
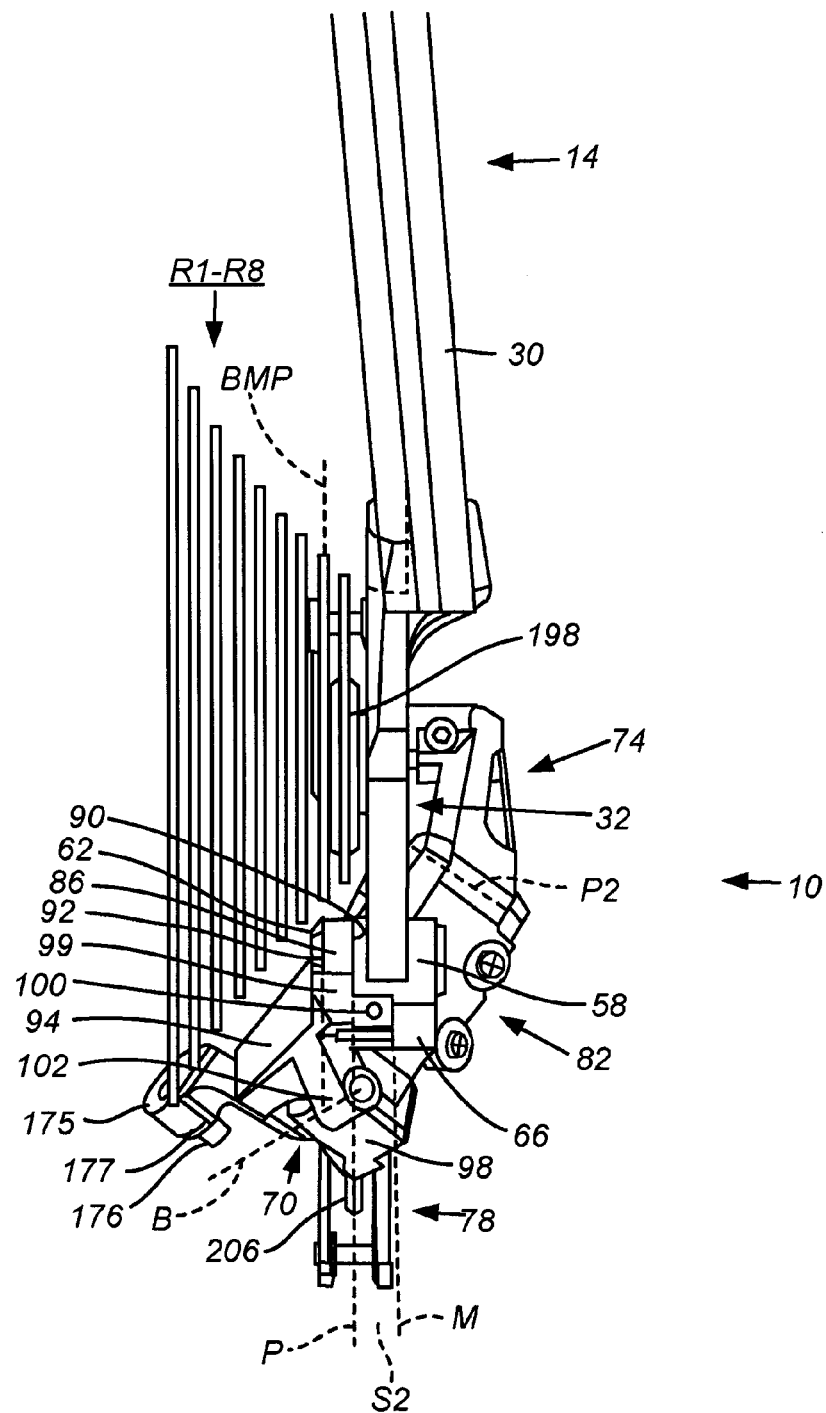
FIG. 3 is a top view of the derailleur in the high speed position.

FIGS. 1-11 are various views of a particular embodiment of a low profile derailleur 10 in various positions. For example, FIG. 1 is a laterally outer view of rear derailleur 10, and FIG. 2 is a rear view of derailleur 10. As shown in FIG. 1, rear derailleur 10 is attached to the rear portion of a bicycle frame 14 for guiding a chain 18 among a plurality of rear sprockets R1-R8 that rotate coaxially around a rear wheel axle 22 supported to frame 14, wherein axle 22 defines a rotational axis X. As used herein, including the claims, the terms up, down, front, rear, laterally inward and laterally outward refer to the orientation of a derailleur as if it were attached in its normal operating position to an upstanding bicycle as shown in FIG. 1, for example, wherein the front of the derailleur is the right portion of the derailleur shown in FIG. 1. The terms left and right refer to the lateral sides of the derailleur when viewed from the rear as shown in FIG. 3. The term laterally inward refers to the side of the derailleur that faces rear sprockets R1-R8 (the left side in FIG. 3), and the term laterally outward refers to the side of the derailleur that faces away from rear sprockets R1-R8 (the right side in FIG. 3).

Bicycle frame 14 is part of an overall bicycle frame that includes a chain stay 26, a seat stay 30 and a frame end 34 (commonly referred to as a dropout) that joins chain stay 26 and seat stay 26 together, typically by welding chain stay 26 and seat stay 30 to frame end 34. Conceptually, each of these frame structures is well known. However, this embodiment employs a configuration of frame end 34 that differs from common frame ends. More specifically, frame end 34 comprises a forward portion 38 and a rearward portion 42, wherein forward portion 38 extends from chain stay 26 and seat stay 30 to a horizontal position aligned with rotational axis X, and rearward portion 42 extends from the horizontal position aligned with rotational axis X rearward. A junction between forward portion 38 and rearward portion 42 forms an axle receiving slot 46 dimensioned to receive rear axle 22 therein. In this embodiment, axle receiving slot 46 is oriented substantially vertical with a slight incline and includes an open end 50 and a closed end 54, wherein open end 50 is disposed below closed end 54. Rearward portion 42 extends rearward and downward at an incline and forms a derailleur attachment structure in the form of a laterally projecting annular mounting boss 58 with an opening 60 dimensioned to receive a derailleur mounting bolt 62 therein. Of course, in some embodiments mounting boss 58 need no project laterally, in which case the surface of opening 60 forms the derailleur attachment structure. In this embodiment, opening 60 may be located from approximately 180° to approximately 240° relative to rotational axis X, or, to facilitate measurement independently of axle 22, from approximately 180° to approximately 240° relative to closed end 54 of axle receiving slot 46. As used herein, all such angular measurements are to be determined by reference to a Cartesian coordinate system wherein the horizontal X axis, from which the angular measurements originate, extends longitudinally of the bicycle in the manner shown in FIG. 1. Rearward portion 42 of frame end 34 extends further rearward from mounting boss 58 to form a position setting abutment 66 that functions in a manner discussed below.

Derailleur 10 comprises a base member 70, a movable member 74 that supports a chain guide 78, and a linking mechanism 82 coupled between base member 70 and movable member 74 so that chain guide 78 moves laterally relative to base member 70. As best seen in FIGS. 2 and 3, base member 70 comprises an annular mounting boss 86 with a mounting surface 90 that faces laterally outward to face mounting boss 58 on frame end 34 and an inner surface 92, opposite mounting surface 90, that faces laterally inward and has an inner base member plane BMP, a transition portion 94 that extends rearward and downward at an incline from mounting boss 86, and a link coupling portion 98 disposed at a lower end portion of extension portion 94.

As best seen in FIGS. 1 and 3, an adjuster mounting boss 99 extends rearward and then laterally outward from mounting boss 86. A laterally outer portion of adjuster mounting boss 99 includes an adjuster mounting structure in the form a threaded opening 100 dimensioned to threadingly engage an adjuster in the form of an adjusting screw 101. The tip of adjusting screw 101 abuts against position setting abutment 66 on frame end 34. Thus, the rotational position between frame end 34 and base member 70 may be adjusted simply by rotating adjusting screw 101.

An outer casing coupler 102 in the form of a hollow cylinder is disposed on an upper portion of transition portion 94, wherein outer casing coupler 102 is dimensioned to couple to and terminate an outer casing 106 of a Bowden cable 110 in a known manner. Outer casing coupler 102 is positioned to be located rearward from rotational axis X and, more particularly, rearward from frame end 34 and at least partially laterally inward from mounting surface 90 of base member 70 as shown in FIG. 3. Outer casing coupler 102 includes an outer casing receiving bore 104 having a bore axis B that is inclined relative to a pulley plane P described below. If desired, a cable adjusting bolt (not shown), the concept and structures of which are well known, may be mounted in outer casing receiving bore 104 so as to be disposed between outer casing coupler 102 and outer casing 106.

As shown in FIGS. 1 and 2, link coupling portion 98 includes a support wall 114, an outer link mounting ear 118 and an inner link mounting ear 122. In this embodiment, inner link mounting ear 122 is formed as an extension of transition portion 94 that inclines laterally inwardly from front to rear and from top to bottom, support wall 114 extends laterally outwardly from inner mounting ear 122 so as to incline rearwardly from top to bottom and from transition portion 94 to the laterally outer end, and outer link mounting ear 118 extends downwardly from support wall 114 so as to incline laterally inwardly from front to rear and from top to bottom.

Movable member 74 comprises a main body 130 and a link mounting frame 134. In this embodiment, main body 130 comprises a generally cylindrical member that houses a torsion coil spring 138, one end of which is inserted into a spring mounting opening 142 formed in a laterally outer side wall 146 of main body 130. Link mounting frame 134 comprises an upper link mounting boss 150, a lower link mounting boss 154, and an upper chain guide link mounting frame 158, all of which are formed as one piece with main body 130.

Linking mechanism 82 comprises linking members in the form of a laterally outer upper link 162 and a laterally inner lower link 166. A first end of upper link 162 is straddled by link coupling portion 98 of base member 70 and is pivotably connected thereto by a pivot shaft 170 that defines a pivot axis P1. The second end of upper link 162 is forked to straddle upper link mounting boss 150 of link mounting frame 134 of movable member 74 and is pivotably connected thereto by a pivot shaft 174 that defines a pivot axis P2. Because of this arrangement, a distance between the outermost edges of the first end of upper link 162 at base member 70 is less than a distance between the outermost edges of the second end of upper link 162 at movable member 74. An outer limit adjusting screw 186 and an inner limit adjusting screw 190 are mounted on upper link 162 to adjust the laterally outermost and laterally innermost positions of movable member 74, respectively, in a well known manner.

Similarly, a first end of lower link 166 is straddled by link coupling portion 98 of base member 70 and is pivotably connected thereto by a pivot shaft 178 that defines a pivot axis P3. An actuating arm 175 extends downwardly and laterally inwardly from the first end of lower link 166 so as to generally conform to the inclined contour formed by the outer peripheral surfaces of the plurality of sprockets R1-R8. A cable attachment structure in the form of a bolt 176 and a clamping washer 177 is provided at the outer end of actuating arm 175 to attach an inner cable 108 of Bowden cable 106 as shown in FIG. 2. As shown in FIG. 3, bolt 176 and washer 177 are disposed laterally inward from mounting surface 90 of base member 70 when chain guide 78 is located at a laterally outermost position.

Lower link 166 is forked beginning in close proximity to pivot shaft 178 to form legs 179 and 180 (FIG. 2) that extend toward movable member 74. Legs 179 and 180 straddle lower link mounting boss 154 of link mounting frame 134 of movable member 74 and is pivotably connected thereto by a pivot shaft 182 (FIG. 1) that defines a pivot axis P4. Because of this arrangement, a distance between the outermost edges of the first end of lower link 166 at base member 70 is less than a distance between the outermost edges of the second end of lower link 166 at movable member 74.

As shown in FIG. 2, legs 179 and 180 of lower link 166 receive a coiled return spring 181 therebetween. One end of spring 181 is connected to base member 70 at pivot shaft 170, and the other end of spring 181 is connected to movable member 74 at pivot shaft 182. As a result, spring 181 biases movable member 74 laterally outwardly.

Chain guide 78 comprises an upper chain guide link 194, a first or upper guide pulley 198 rotatably mounted to upper chain guide link 194 through a pivot shaft 200, a lower chain guide link 202, and a second or lower tension pulley 206 rotatably mounted to lower chain guide link 202 through a pivot shaft 208. Upper chain guide link 194 is pivotably connected to upper chain guide link mounting frame 158 through a pivot shaft 210. Upper chain guide link 194 comprises a chain pushing member 214 and a chain regulating unit 218. Chain pushing member 214 is disposed between upper chain guide link mounting frame 158 and guide pulley 198, with an arcuate portion 222 disposed in close proximity to the teeth on guide pulley 198. Chain pushing member 214 is provided to push chain 18 when switching chain 18 from a smaller diameter sprocket to a larger diameter sprocket and to prevent chain 18 from derailing from guide pulley 198. Chain pushing member 214 rotates around a chain pushing member rotational axis defined by pivot shaft 210, which in this embodiment is offset from a first pulley axis defined by pivot shaft 200. As a result, both guide pulley 198 and chain pushing member 214 rotate around the chain pushing member rotational axis defined by pivot shaft 210.

Chain regulating unit 218 comprises an inner plate 226, an outer plate 230 and a regulator pin 234. A radially inner end of inner plate 226 is coupled to pivot shaft 200, and a radially outer end of inner plate 226 is fastened to one end of regulator pin 234. A radially inner portion of outer plate 230 joins with chain pushing member 214 and is coupled to pivot shaft 210, and a radially outer end of outer plate 230 is fastened to the other end of regulator pin 234. Inner plate 226 helps to prevent chain 18 from derailing from guide pulley 198 when switching chain 18 from a larger diameter sprocket to a smaller diameter sprocket, and outer plate 230 helps to prevent chain 18 from derailing from guide pulley 198 when switching chain 18 from a smaller diameter sprocket to a larger diameter sprocket. Regulator pin 234 helps to prevent excessive radial movement of chain 18 and ensures that upper chain guide link 194 rotates counterclockwise around pivot shaft 210 in response to forward swinging of chain 18. However, chain regulating unit 218 may be omitted in some embodiments.

Figure 4:
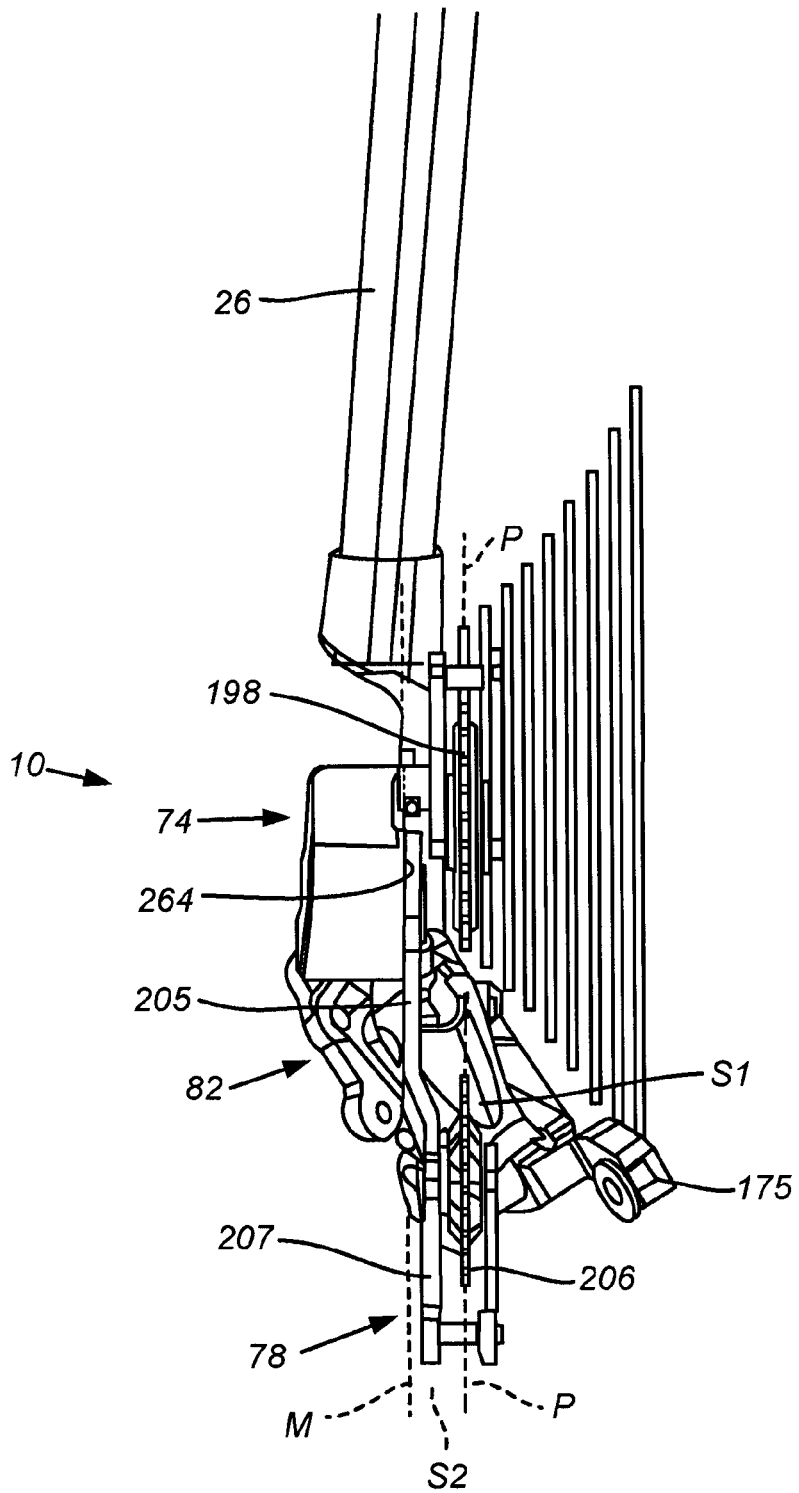
FIG. 4 is a bottom view of the derailleur in the high speed position.
Figure 5:
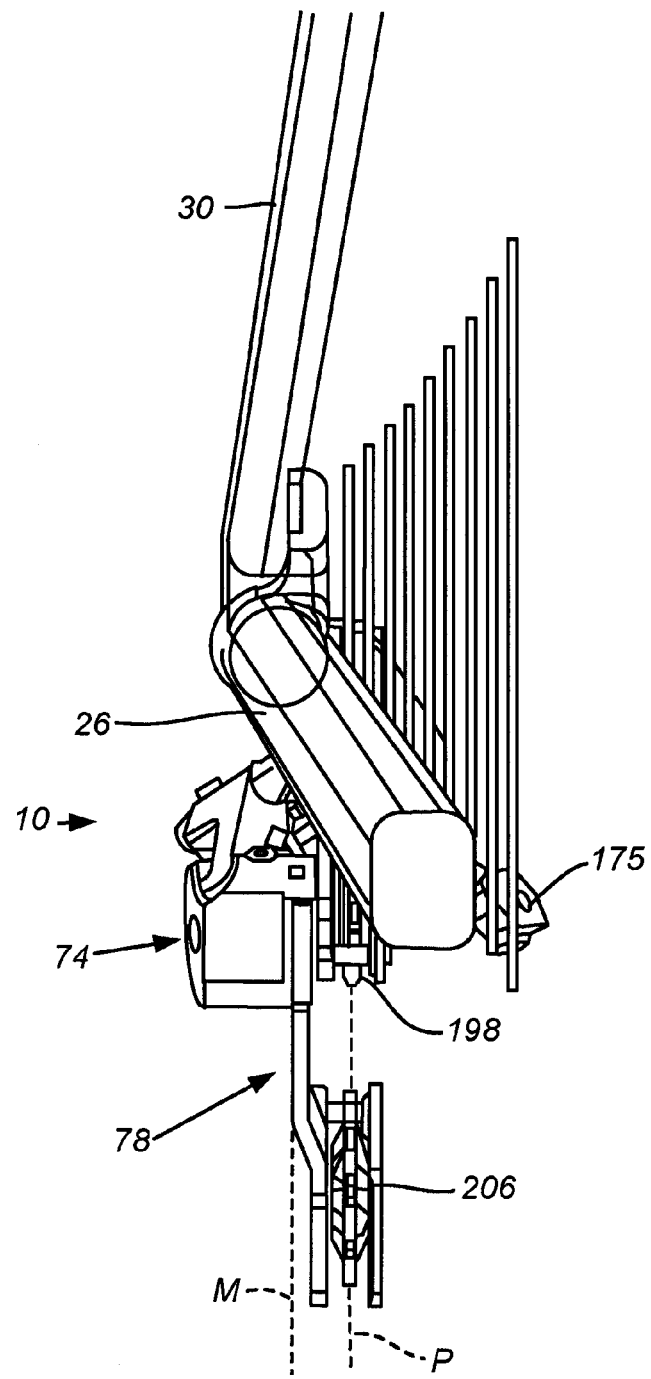
FIG. 5 is a front view of the derailleur in the high speed position.

As shown in FIG. 2, an upper end 205 of lower chain guide link 202 is pivotably coupled to main body 130 of movable member 74 through a pivot shaft 238 and includes a plurality of, e.g., three spring coupling openings 242. The other end of spring 138 mentioned above is inserted into one of the spring coupling openings 242 to set a desired biasing force on lower chain guide link 202. As a result, lower chain guide link 202 is biased clockwise in FIG. 1. A lower end 207 of lower chain guide link 202 rotatably supports tension pulley 206 through pivot shaft 208 and nonrotatably supports a chain regulating unit 248. In this embodiment, as shown in FIG. 4, upper end 205 is substantially vertically straight and is laterally inwardly offset relative to lower end 207, which also is substantially vertically straight. As with chain regulating unit 218, chain regulating unit 248 comprises an inner plate 252, an outer plate 256 and a regulator pin 260. A radially inner end of inner plate 252 is coupled to pivot shaft 208, and a radially outer end of inner plate 252 is fastened to one end of regulator pin 260. In this embodiment, outer plate 256 is formed as a part of lower chain guide link 202 and supports pivot shaft 208. A radially outer end of outer plate 256 is fastened to the other end of regulator pin 260. Inner plate 252 helps to prevent chain 18 from derailing from tension pulley 206 when switching chain 18 from a larger diameter sprocket to a smaller diameter sprocket, and outer plate 256 helps to prevent chain 18 from derailing from tension pulley 206 when switching chain 18 from a smaller diameter sprocket to a larger diameter sprocket. Regulator pin 260 helps to prevent excessive radial movement of chain 18. Chain regulating unit 248 may be omitted in some embodiments.

In this embodiment, base member 70, movable member 74, chain guide 78 and linking mechanism 82 are dimensioned so that guide pulley 198 is located at a range of from approximately 220° to approximately 270° relative to rotational axis X when chain guide 78 is disposed in the laterally outermost position.

As shown in FIG. 4, guide pulley 198 has a pulley plane P that bisects guide pulley 198. In this embodiment, each tooth on guide pulley 198 is symmetrical and centered on the pulley when viewed perpendicular to pivot shaft 200 so that pulley plane P is located in the center of guide pulley 198, and all of the pulley teeth lie in pulley plane P. In this embodiment, pulley plane P also bisects tension pulley 206. In order to provide a decreased laterally outward profile for derailleur 10, the components are structured so that pulley plane P intersects at least one of upper link 162 or lower link 166 when chain guide 78 is disposed in a position somewhere between a laterally outermost rest position and a laterally innermost position (such as the laterally outermost position shown in FIG. 4).

As used throughout herein, including the claims, the word "intersect" has the ordinary meaning of having one or more points in common. Thus, the term also includes, for example, a tangent relationship, wherein the word "tangent" has the ordinary meaning of making contact at a single point or along a line. The laterally outermost position may be the laterally outermost position when derailleur 10 is removed from the bicycle. In this case, the laterally outermost position may be determined by the position of chain guide 78 with the derailleur at rest and subjected only to the biasing force of return spring 181, and the laterally innermost position is determined by the position of chain guide 78 when chain guide 78 is manually pulled to its laterally innermost position. Alternatively, the laterally outermost position may be determined by the position of chain guide 78 when it is set to be aligned with the smallest diameter rear sprocket R1, and the laterally innermost position may be determined by the position of chain guide 78 when it is set to be aligned with the largest diameter rear sprocket R8. The word "between" is used in an inclusive sense.

Figure 6:
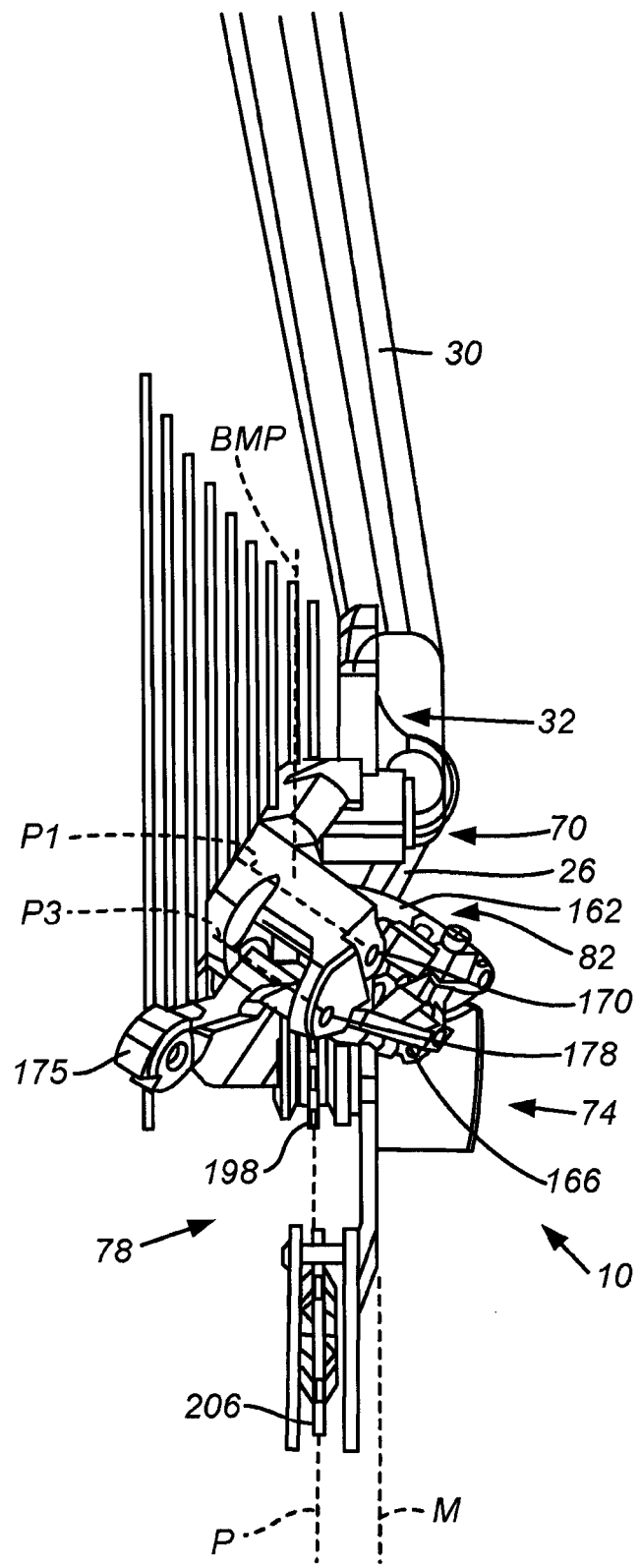
FIG. 6 is a rear view of the derailleur in the high speed position.
Figure 7:
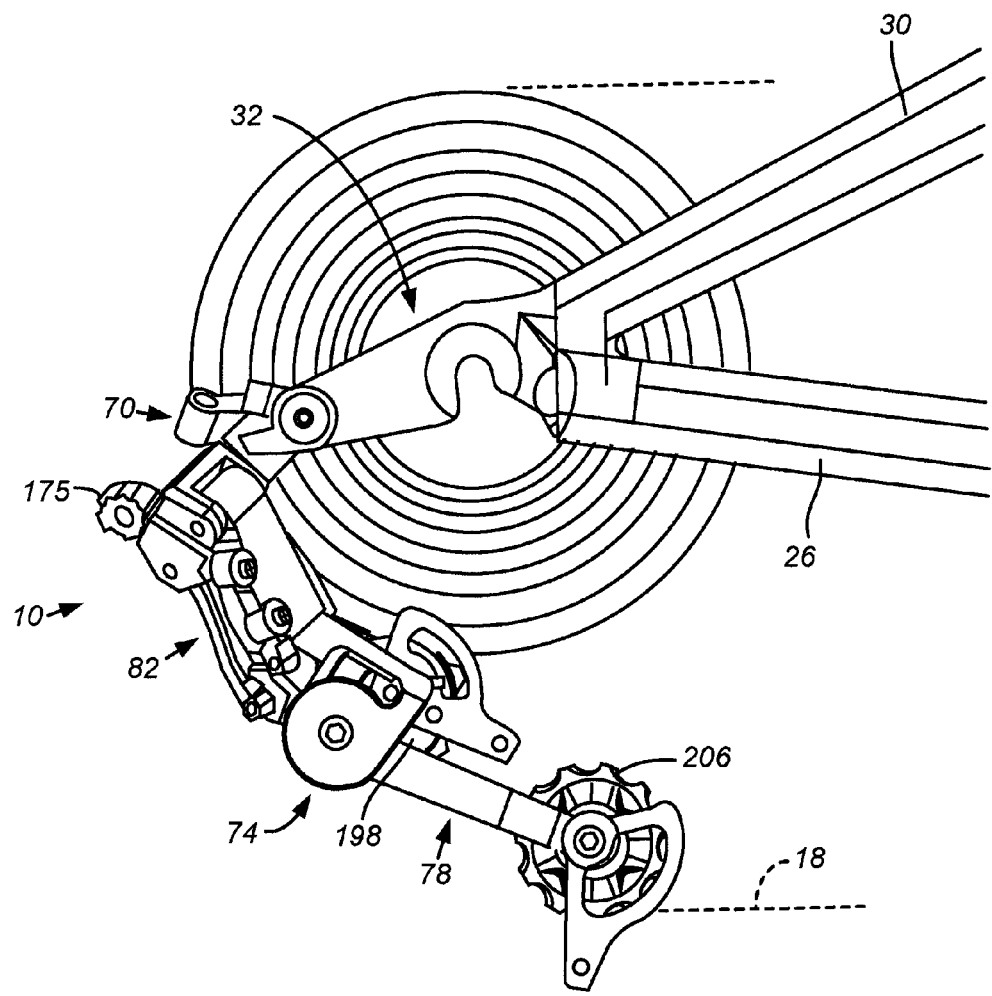
FIG. 7 is a side view of the derailleur in a low speed position.

Furthermore, in this embodiment, pulley plane P intersects at least one of pivot axis P1 or pivot axis P3 when measured across all components at the coupling when chain guide 78 is disposed in a position somewhere between a laterally outermost rest position and a laterally innermost position (such as the laterally outermost position shown in FIG. 6). For example, pivot shaft 170 defines pivot axis P1 and couples upper link 162 to base member 70. The laterally outer tip of pivot shaft 170 is exposed at outer link mounting member 118, whereas the laterally inner tip of pivot shaft 170 is inserted into a blind bore (not shown) in inner link mounting member 122 so that the inner lateral tip is not exposed at inner link mounting member 122. The length of pivot axis P1 measured across all components at the coupling therefore extends from the laterally outer tip of pivot shaft 170 at pivot axis P1 to the laterally inner surface of inner link mounting member 122 at pivot axis P1. Similarly, pivot shaft 178 defines pivot axis P3 and couples lower link 166 to base member 70. The laterally outer tip of pivot shaft 178 is exposed at outer link mounting member 118, whereas the laterally inner tip of pivot shaft 178 is inserted into a blind bore (not shown) in inner link mounting member 122 so that the inner lateral tip is not exposed at inner link mounting member 122. The length of pivot axis P3 measured across all components at the coupling therefore extends from the laterally outer tip of pivot shaft 178 at pivot axis P3 to the laterally inner surface of inner link mounting member 122 at pivot axis P3.

In this embodiment, pulley plane P intersects both upper link 162 and lower link 166 as well as pivot axes P1 and P3 when chain guide 78 is disposed in a position somewhere between the laterally outermost position and the laterally innermost position, such as the laterally outermost position shown in FIG. 4. However, it is not necessary to intersect all recited components at all lateral positions of chain guide 78. For example, while at least one of pivot axes P1-P4 is disposed on a laterally inner side of pulley plane P, and at least one of pivot axes P1-P4 is disposed on a laterally outer side of pulley plane P, in this embodiment second pivot axis P2 as measured according to the definition above is disposed entirely on the laterally outer side of pulley plane P (as well as movable member plane M) in the position shown in FIG. 3. In this embodiment, pulley plane P intersects a space S1 between any facing surfaces (e.g., surfaces 261 and 262 shown in FIG. 2) of upper link 162 and lower link 166 as shown in FIG. 4. Pulley plane P also intersects base member 70 when chain guide 78 is disposed in a position somewhere between the laterally outermost position and the laterally innermost position, such as the laterally outermost position shown in FIG. 3.

As shown further in FIG. 4 (with spring 181 removed for clarity), a movable member plane M that is substantially parallel to pulley plane P intersects an innermost surface 264 of movable member 74. In this embodiment, innermost surface 264 is coplanar with movable member plane M, although other configurations are possible since movable member 74 may have many different shapes. Movable member plane M intersects both upper link 162 and lower link 166, pivot axes P1 and P3, and the space S1 between facing surfaces of upper link 162 and lower link 16 when chain guide 78 is disposed in a position somewhere between the laterally outermost position and the laterally innermost position. Furthermore, at least a portion of a space S2 between movable member plane M and pulley plane P intersects the space S1 between facing surfaces of upper link 162 and lower link 16 when chain guide 78 is disposed in a position somewhere between the laterally outermost position and the laterally innermost position, such as the laterally outermost position shown in FIG. 4.

Figure 8:
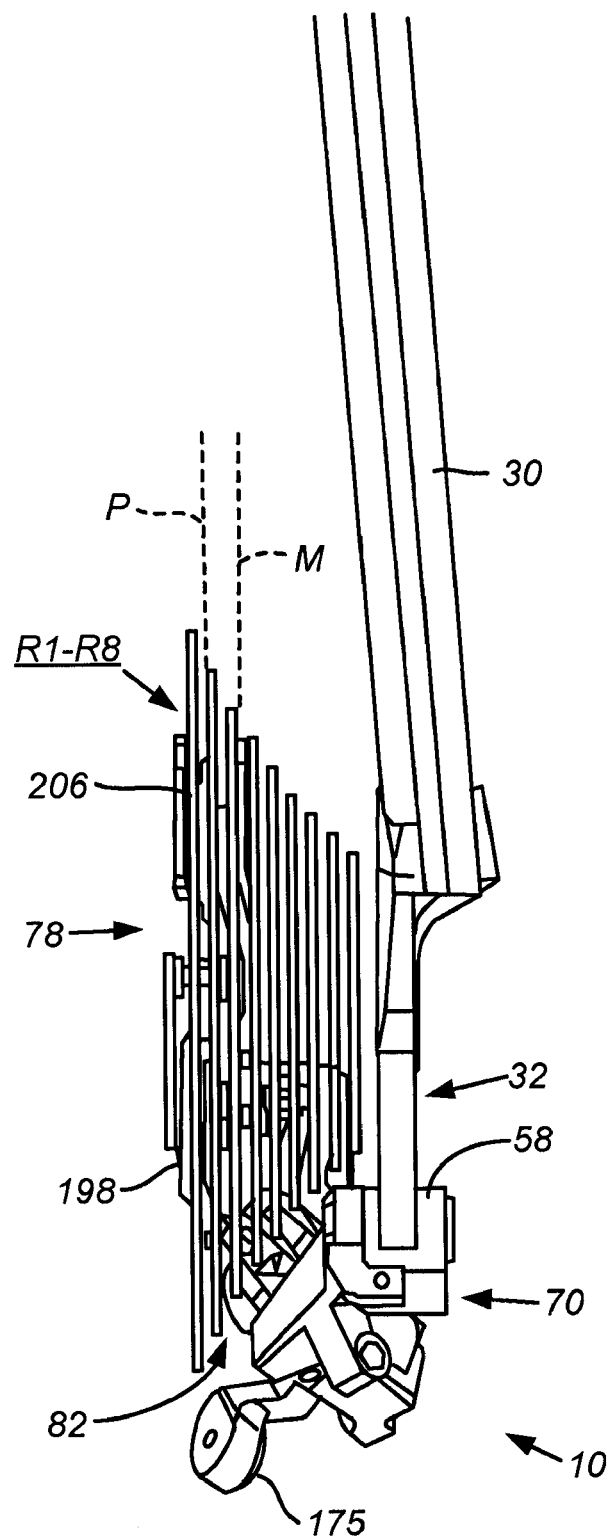
FIG. 8 is a top view of the derailleur in the low speed position.
Figure 9:
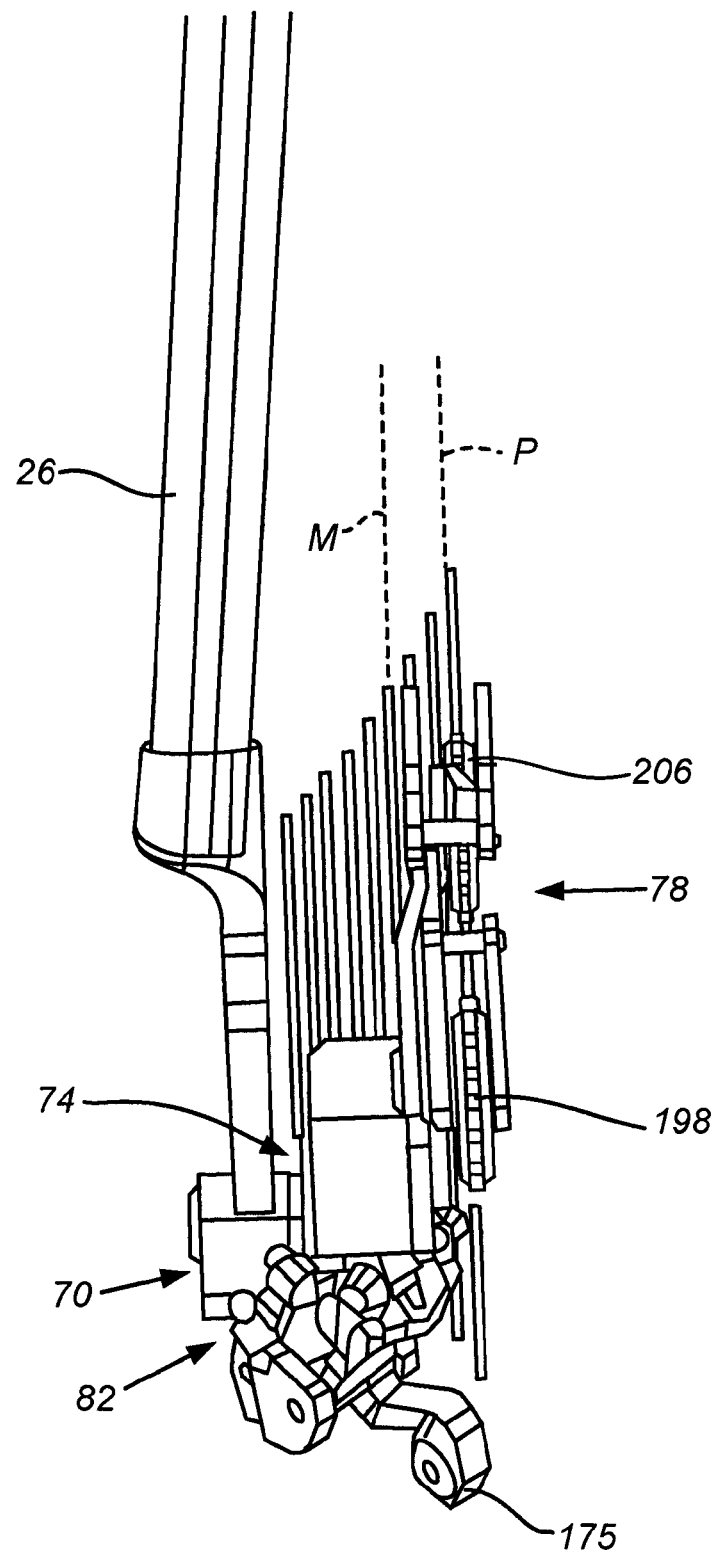
FIG. 9 is a bottom view of the derailleur in the low speed position.
Figure 10:
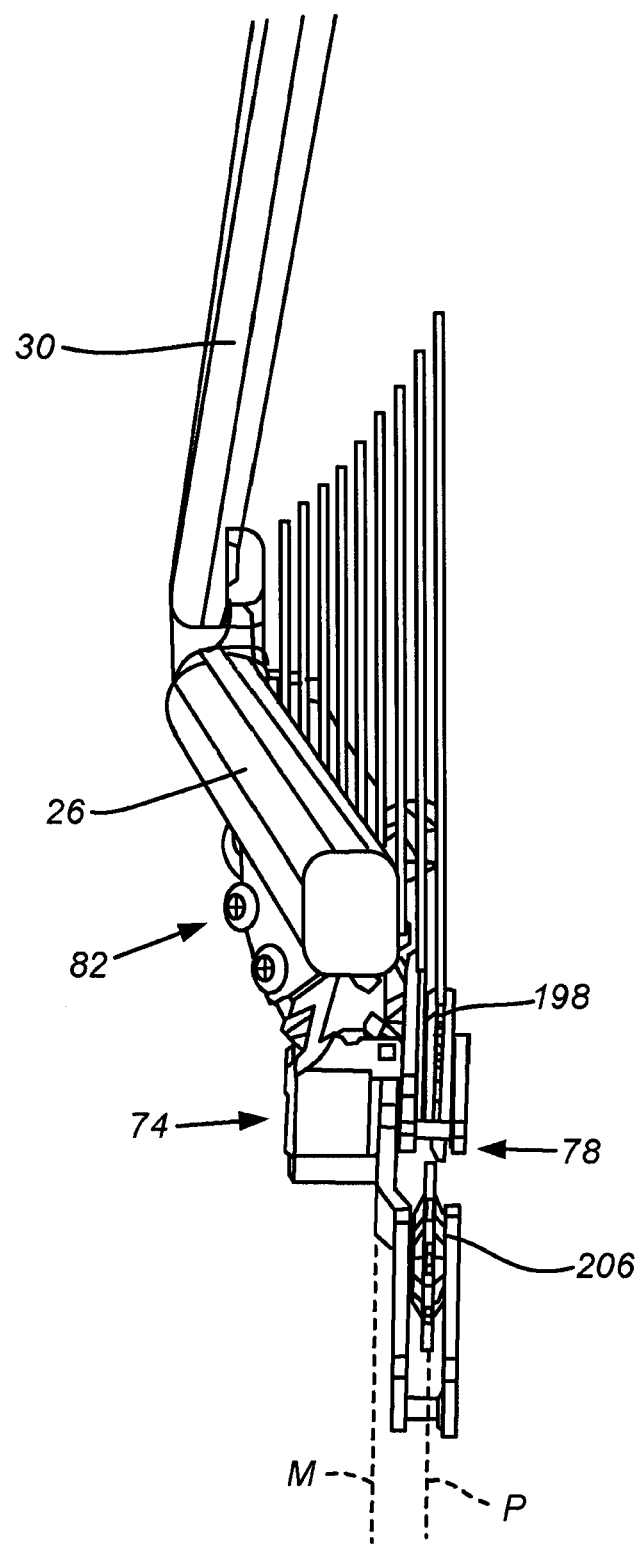
FIG. 10 is a front view of the derailleur in the low speed position.
Figure 11:
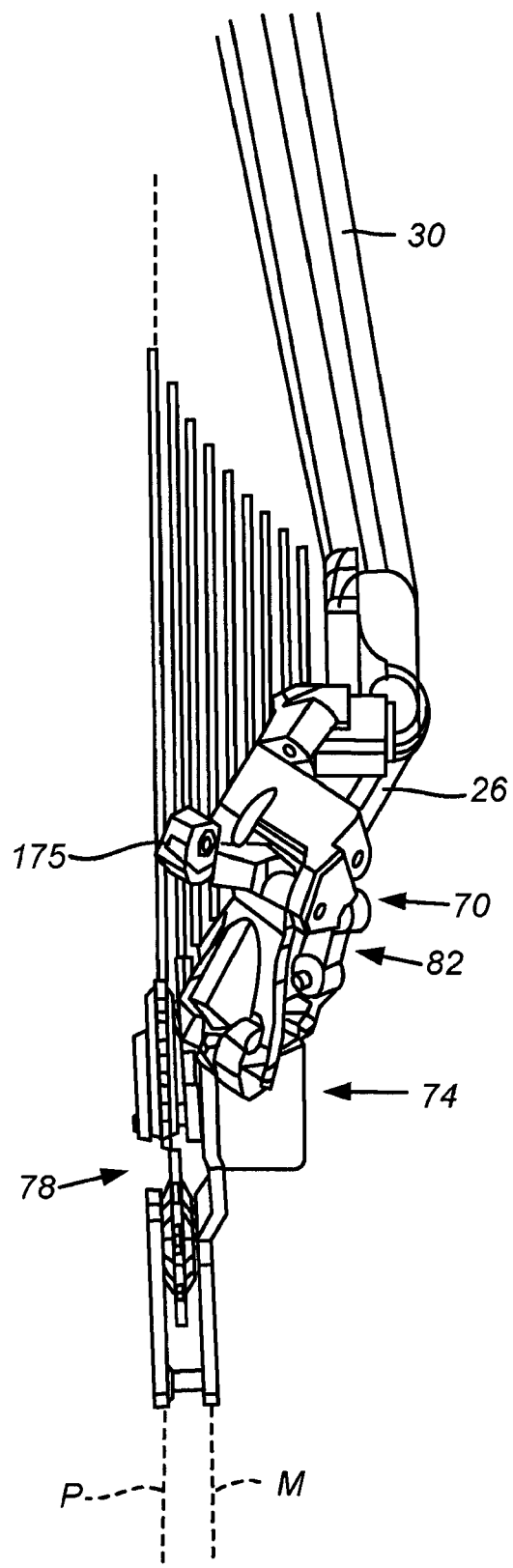
FIG. 11 is a rear view of the derailleur in the low speed position.

As shown in FIGS. 3 and 8, derailleur 10 has a very low lateral profile. For example, when chain guide 78 is located in the laterally outermost position shown in FIG. 3, the components barely protrude laterally outward relative to frame 14. Actuating arm 175 and portions of linkage mechanism 82 are disposed laterally inward from pulley plane P and movable member plane M and follow the diagonal contour of sprockets R1-R8, thereby forming a very compact structure. When chain guide 78 is located in the laterally innermost position shown in FIG. 8, mounting boss 58 is the laterally outermost portion of derailleur 10. In fact, mounting boss 58 does not even protrude laterally outward relative to chain stay 26 or seat stay 30. In this position, actuating arm 175 and linkage mechanism 82 again following the diagonal contour of sprockets R1-R8.

Prior art derailleurs do not have the ability to have such a low profile. One reason is that the chain guide in prior art derailleurs has a chain pushing member that is formed as one piece with an inner plate that extends from the upper guide pulley to the lower tension pulley, and this inner plate limits the ability of the chain guide to move laterally outwardly. In the presently disclosed embodiment, chain pushing member 214 is dimensioned to as not to interfere with the ability of chain guide 78 to move laterally outwardly. The two-piece structure of chain guide 78 further facilitates such lateral movement. Furthermore, the base member and linking mechanism in prior art derailleurs are dimensioned to be mounted substantially below, or even in front of, the rotational axis X of the rear wheel, and this requires sufficient lateral spacing to ensure that the linking mechanism does not strike the sprockets during operation. Since base member 70, upper link 162, lower link 166 movable member 74 and chain guide 78 in the presently disclosed embodiment are dimensioned so that guide pulley 198 is located at a range of from approximately 220° to approximately 270° relative to rotational axis X when chain guide 78 is disposed in the laterally outermost position, the lateral distance required for the components further decreases because the linking mechanism is able to more closely follow the contour formed by the outer peripheral surfaces of the plurality of sprockets R1-R8. Of course, while many of the features described herein contribute to a markedly low profile derailleur, not all features are required, depending upon the application.

Figure 12:
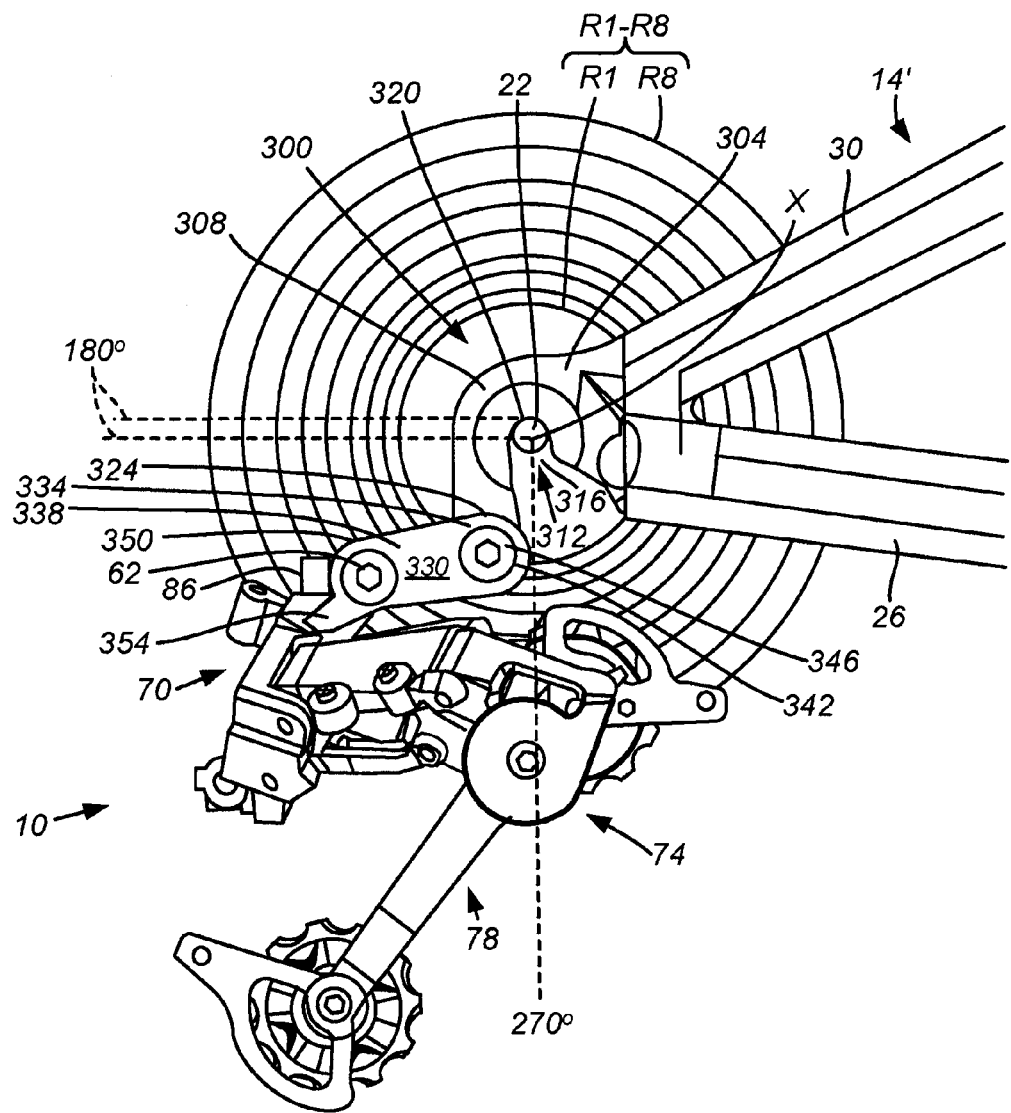
FIG. 12 is a laterally outer view of the rear derailleur attached to a conventional frame.

FIG. 12 is a laterally outer view of rear derailleur 10 mounted to a frame end 300 of a conventional frame 14'. In this case, frame end 300 comprises a forward portion 304 and a rearward portion 308, wherein forward portion 304 extends from chain stay 26 and seat stay 30 to a horizontal position aligned with rotational axis X, and rearward portion 308 extends from a horizontal position aligned with rotational axis X rearwardly and substantially vertically downwardly. A junction between forward portion 304 and rearward portion 308 forms an axle receiving slot 312 dimensioned to receive rear axle 22 therein. In this embodiment, axle receiving slot 312 again is oriented substantially vertically with a slight incline and defines an open end 316 and a closed end 320, wherein open end 316 is disposed below closed end 320. Rearward portion 308 forms an annular mounting boss 324 with an opening (not shown) dimensioned to receive a mounting bolt 328 therein.

Derailleur 10 is mounted to an extension member 330 having a first end portion 334 and a second end portion 338, wherein first end portion 334 includes a mounting opening 342 dimensioned for receiving mounting bolt 346 therein. Second end portion 338 includes a derailleur attachment structure in the form of a derailleur mounting opening 350 dimensioned for receiving mounting bolt 62 therethrough. Extension member 330 is dimensioned such that, when extension member 330 is attached to frame end 300, mounting opening 350, and hence boss member 86 of base member 70 of derailleur 10, is located from approximately 180° to approximately 240° relative to axle receiving opening 312, from approximately 180° to approximately 240° relative to rotational axis X, or, to facilitate measurement independently of axle 22, from approximately 180° to approximately 240° relative to closed end 320 of axle receiving opening 312. Rearward portion 38 extends further rearwardly from derailleur mounting opening 350 to form a position setting abutment 354 that functions in the same manner as position setting abutment 66 in the first embodiment.

While the above is a description of various embodiments of inventive features, further modifications may be employed without departing from the spirit and scope of the present invention. For example, the size, shape, location or orientation of the various components may be changed as desired. Components that are shown directly connected or contacting each other may have intermediate structures disposed between them. The functions of one element may be performed by two, and vice versa. The function of one element may be performed by another, and functions may be interchanged among the elements. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:
1. A bicycle rear derailleur comprising:
  a base member including;
    a bicycle mounting portion for attaching to a bicycle frame member, wherein the bicycle mounting portion has a laterally inwardly facing surface and a laterally outwardly facing surface opposite the laterally inwardly facing surface, wherein at least one of the laterally inwardly facing surface or the laterally outwardly facing surface is adapted to face the bicycle frame member when the bicycle mounting portion is attached to the bicycle frame member, wherein the laterally inwardly facing surface forms an inner base member plane; and
    a link coupling portion;

wherein at least a portion of the link coupling portion is disposed laterally inwardly of the inner base member plane;

a movable member that supports a chain guide including a first pulley that rotates around a first pulley axis, wherein the pulley has a pulley plane that is substantially perpendicular to the first pulley axis and bisects the pulley; and a first linking member pivotably coupled to the link coupling portion of the base member for pivoting around a first pivot axis that intersects the inner base member plane and pivotably coupled to the movable member for pivoting around a second pivot axis so that the chain guide moves laterally relative to the base member between a first lateral position and a second lateral position;

wherein, when the derailleur is viewed perpendicular to the first pulley axis such that the first pulley axis is horizontal and the pulley plane is vertical, at least one of the first pivot axis or the second pivot axis is vertically inclined relative to the pulley plane so that, when the derailleur is viewed from laterally outwardly of the derailleur along the first pulley axis such that the first pulley axis is disposed below and to the right of the base member, the first pulley is located in a laterally outward upper position when the chain guide is in the first position, and the first pulley is located in a laterally inward lower position when the chain guide is in the second lateral position; and wherein the pulley plane intersects the first linking member when the chain guide is located at a first position between the first lateral position and the second lateral position.

2. The derailleur according to claim 1 further comprising a biasing member that biases the movable member so that the chain guide is set at the first lateral position, wherein the pulley plane intersects the first linking member when the chain guide is located at the first lateral position.

3. The derailleur according to claim 2 wherein the first lateral position is a laterally outermost position of the chain guide.

4. The derailleur according to claim 1 further comprising a second linking member coupled between the base member and the movable member so that the chain guide moves laterally relative to the base member between the first lateral position and the second lateral position, wherein the second linking member is disposed laterally outward from the first linking member.

5. The derailleur according to claim 4 wherein the pulley plane intersects the second linking member when the chain guide is located at a second position between the first lateral position and the second lateral position.

6. The derailleur according to claim 5 wherein the first position is the same as the second position.

7. The derailleur according to claim 5 further comprising a biasing member that biases the movable member so that the chain guide is set at the first lateral position, wherein the pulley plane intersects the first linking member when the chain guide is located at the first lateral position.

8. The derailleur according to claim 7 wherein the pulley plane intersects the second linking member when the chain guide is located at the first lateral position.

9. The derailleur according to claim 8 wherein the first lateral position is a laterally outermost position of the chain guide.

10. The derailleur according to claim 4 wherein the pulley plane intersects a space between the first linking member and the second linking member when the chain guide is located at the first position.

11. The derailleur according to claim 10 wherein a movable member plane intersects an innermost surface of the movable member and is oriented substantially parallel to the pulley plane, and wherein at least a portion of a space between the pulley plane and the movable member plane intersects the space between the first linking member and the second linking member.

12. The derailleur according to claim 11 wherein the movable member plane intersects at least one of the first linking member or the second linking member when the chain guide is located at the first position.

13. The derailleur according to claim 12 further comprising a biasing member that biases the chain guide so that the chain guide is set at the first lateral position, wherein the movable member plane intersects the first linking member when the chain guide is located at the first lateral position.

14. The derailleur according to claim 13 wherein the first lateral position is a laterally outermost position of the chain guide.

15. The derailleur according to claim 14 wherein the movable member plane intersects the second linking member when the chain guide is located at the first lateral position.

16. The derailleur according to claim 11 wherein the movable member plane intersects the space between the first linking member and the second linking member when the chain guide is located at the first position.

17. The derailleur according to claim 16 further comprising a biasing member that biases the chain guide so that the chain guide is set at the first lateral position, wherein the movable member plane intersects the first linking member when the chain guide is located at the first lateral position.

18. The derailleur according to claim 17 wherein the first lateral position is a laterally outermost position of the chain guide.

19. The derailleur according to claim 1 wherein the first position is a laterally outermost position, and further comprising:

a chain pushing member disposed between the first pulley and the movable member;

wherein the chain pushing member is dimensioned to avoid interference with the first linking member when the chain guide is located at the laterally outermost position.

20. The derailleur according to claim 19 wherein the chain pushing member is mounted for rotation around a chain pushing member rotational axis that is offset from the first pulley axis.

21. The derailleur according to claim 20 wherein the first pulley rotates together with the chain pushing member around the chain pushing member rotational axis.

22. The derailleur according to claim 21 further comprising a second pulley mounted to the chain guide for rotation around a second pulley axis, wherein the second pulley also rotates around a rotational axis that is offset from the second pulley axis.

23. The derailleur according to claim 22 wherein the chain pushing member rotational axis is offset from the rotational axis.

24. The derailleur according to claim 1 wherein the pulley plane intersects the base member when the chain guide is located at the first position.

25. The derailleur according to claim 24 wherein the first position is a laterally outermost position.

26. The derailleur according to claim 1 wherein the first linking member is pivotably coupled between the base member and the movable member at a first pivot location and at a second pivot location;
   wherein a first width of the first linking member at the first pivot location is different from a second width of the first linking member at the second pivot location.

27. The derailleur according to claim 26 wherein the first width is less than the second width.

28. The derailleur according to claim 27 wherein the first linking member is pivotably coupled to the base member at the first pivot location, and wherein the first linking member is pivotably coupled to the movable member at the second pivot location.

29. The derailleur according to claim 28 wherein the first linking member straddles one of the base member or the movable member, and wherein the first linking member is straddled by the other one of the base member or the movable member.

30. The derailleur according to claim 29 wherein the first linking member straddles the movable member, and wherein the first linking member is straddled by the base member.

31. The derailleur according to claim 1 wherein the base member includes an outer casing coupler dimensioned to couple to an outer casing of a Bowden cable, wherein the outer casing coupler is disposed laterally inward from the laterally outwardly facing surface.

32. The derailleur according to claim 31 wherein the outer casing coupler is structured to terminate the outer casing of the Bowden cable.

33. The derailleur according to claim 32 wherein the outer casing coupler includes an outer casing receiving bore that has a bore axis, wherein the bore axis is inclined relative to the pulley plane from a laterally outer upper portion to a laterally inner lower portion.

34. The derailleur according to claim 1 further comprising a cable attachment member for directly attaching an operating cable that moves to operate the derailleur, wherein the cable attachment member is disposed laterally inward from the laterally outwardly facing surface.

35. The derailleur according to claim 34 wherein the cable attachment member is disposed laterally inward from the laterally outwardly facing surface when the chain guide is located at a laterally outermost position.

36. The derailleur according to claim 1 wherein the link coupling portion is dimensioned to be located rearward of a rotational axis of a rear wheel of the bicycle.

37. The derailleur according to claim 1 wherein the first pulley is disposed forward of the link coupling portion.

38. The derailleur according to claim 1 wherein the first linking member extends forward of the link coupling portion.

39. The derailleur according to claim 1 wherein the base member is formed as one piece, wherein the base member is structured to be mounted directly to the bicycle frame member, and wherein the laterally outwardly facing surface is adapted to face the bicycle frame member when the bicycle mounting portion is attached to the bicycle frame member.

40. The derailleur according to claim 1 wherein the base member is structured to be mounted to the bicycle frame member through an intermediate member.

41. The derailleur according to claim 1 further comprising:
   an extension member structured to be mounted to the bicycle frame member; and
   wherein the base member is mounted to the extension member.

42. The derailleur according to claim 1 wherein both the first pivot axis and the second pivot axis are vertically inclined relative to the pulley plane.

43. The derailleur according to claim 1 wherein the first pivot axis is substantially parallel to the second pivot axis.

44. The derailleur according to claim 1 wherein at least one of the first pivot axis or the second pivot axis extends from a laterally inner upper location to a laterally outer lower location.

45. A bicycle rear derailleur comprising:
   a base member including;
      a bicycle mounting portion for attaching to a bicycle frame member, wherein the bicycle mounting portion has a laterally inwardly facing surface and a laterally outwardly facing surface opposite the laterally inwardly facing surface, wherein at least one of the laterally inwardly facing surface or the laterally outwardly facing surface is adapted to face the bicycle frame member when the bicycle mounting portion is attached to the bicycle frame member, wherein the laterally inwardly facing surface forms an inner base member plane; and
      a link coupling portion;
      wherein at least a portion of the link coupling portion is disposed laterally inwardly of the inner base member plane;
   a movable member that supports a chain guide including a first pulley that rotates around a first pulley axis, wherein the pulley has a pulley plane that is substantially perpendicular to the first pulley axis and bisects the pulley; and
   a first linking member coupled between the base member and the movable member so that the chain guide moves laterally relative to the base member between a first lateral position and a second lateral position;
   wherein the first linking member is coupled to the link coupling portion of the base member for pivoting around a first pivot axis that is measured across all components at the coupling of the first linking member and the base member, wherein the first pivot axis terminates at opposite ends where the first pivot axis intersects the opposite outermost surfaces of the components at the coupling of the first linking member and the base member, and wherein the first pivot axis intersects the inner base member plane;
   wherein the first linking member is coupled to the movable member for pivoting around a second pivot axis that is measured across all components at the coupling of the first linking member and the movable member, and wherein the second pivot axis terminates at opposite ends where the second pivot axis intersects the opposite outermost surfaces of the components at the coupling of the first linking member and the movable member;
   wherein, when the derailleur is viewed perpendicular to the first pulley axis such that the first pulley axis is horizontal and the pulley plane is vertical, at least one of the first pivot axis or the second pivot axis is vertically inclined relative to the pulley plane so that, when the derailleur is viewed from laterally outwardly of the derailleur along the first pulley axis such that the first pulley axis is disposed below and to the right of the base member, the first pulley is located in a laterally outward upper position when the chain guide is in the first position, and the first pulley is located in a laterally inward lower position when the chain guide is in the second lateral position; and
   wherein the pulley plane intersects at least one of the first pivot axis or the second pivot axis when the chain guide is located at a first position between the first lateral position and the second lateral position.

46. The derailleur according to claim 45 further comprising a biasing member that biases the chain guide so that the chain guide is set at the first lateral position, wherein the pulley plane intersects the at least one of the first pivot axis or the second pivot axis when the chain guide is located at the first lateral position.

47. The derailleur according to claim 46 wherein the first lateral position is a laterally outermost position of the chain guide.

48. The derailleur according to claim 47 wherein the pulley plane intersects the first pivot axis when the chain guide is located at the first lateral position.

49. The derailleur according to claim 45 wherein a movable member plane intersects an innermost surface of the movable member and is oriented substantially parallel to the pulley plane, and wherein the movable member plane intersects at least one of the first pivot axis or the second pivot axis when the chain guide is located at the first lateral position.

50. The derailleur according to claim 49 further comprising a biasing member that biases the movable member so that the chain guide is set at the first lateral position, wherein the movable member plane intersects the at least one of the first pivot axis or the second pivot axis when the chain guide is located at the first lateral position.

51. The derailleur according to claim 50 wherein the first lateral position is a laterally outermost position of the chain guide.

52. The derailleur according to claim 51 wherein the movable member plane intersects the second pivot axis when the chain guide is located at the first lateral position.

53. The derailleur according to claim 49 wherein the movable member plane intersects the first pivot axis when the chain guide is located at the first lateral position.

54. The derailleur according to claim 45 wherein at least a portion of the first pivot axis is disposed on a laterally inner side of the pulley plane, and wherein at least a portion of the second pivot axis is disposed on a laterally outer side of the pulley plane.

55. The derailleur according to claim 54 wherein the second pivot axis is disposed entirely on the laterally outer side of the pulley plane.

56. The derailleur according to claim 45 wherein the link coupling portion is dimensioned to be located rearward of a rotational axis of a rear wheel of the bicycle.

57. The derailleur according to claim 45 wherein the first pulley is disposed forward of the link coupling portion.

58. The derailleur according to claim 45 wherein the first linking member extends forward of the link coupling portion.

59. The derailleur according to claim 45 wherein the base member is formed as one piece, wherein the base member is structured to be mounted directly to the bicycle frame member, and wherein the laterally outwardly facing surface is adapted to face the bicycle frame member when the bicycle mounting portion is attached to the bicycle frame member.

60. The derailleur according to claim 45 wherein the base member is structured to be mounted to the bicycle frame member through an intermediate member.

61. The derailleur according to claim 45 further comprising:
an extension member structured to be mounted to the bicycle frame member; and
wherein the base member is mounted to the extension member.

62. The derailleur according to claim 45 wherein both the first pivot axis and the second pivot axis are vertically inclined relative to the pulley plane.

63. The derailleur according to claim 45 wherein the first pivot axis is substantially parallel to the second pivot axis.

64. The derailleur according to claim 45 wherein at least one of the first pivot axis or the second pivot axis extends from a laterally inner upper location to a laterally outer lower location.

65. A bicycle rear assembly comprising:
a continuous, one-piece bicycle frame end including:
a main body defining an axle receiving opening dimensioned to receive a bicycle wheel axle therein to rotate around a rotational axis, wherein the axle receiving opening includes an open end and a closed end, wherein the closed end is tangent to a horizontal axis of a Cartesian coordinate system at a common point when viewed along the rotational axis when the bicycle frame end is in an upright position of normal operation of the bicycle along a horizontal surface, wherein the common point forms the origin of the Cartesian coordinate system, and wherein the zero axis of the Cartesian coordinate system is the portion of the horizontal axis forward of the origin; and
a derailleur attachment structure located from approximately 180° to approximately 240° in the Cartesian coordinate system;
a base member structured to be directly mounted to the derailleur attachment structure so that the base member is located from approximately 180° to approximately 240° in the Cartesian coordinate system, wherein the base member includes:
a mounting portion for attaching to the derailleur attachment structure, wherein the mounting portion has a laterally inwardly facing surface and a laterally outwardly facing surface opposite the laterally inwardly facing surface, wherein at least one of the laterally inwardly facing surface or the laterally outwardly facing surface faces the derailleur attachment structure when the mounting portion is attached to the derailleur attachment structure, wherein the laterally inwardly facing surface forms an inner base member plane; and
a link coupling portion,
wherein at least a portion of the link coupling portion is disposed laterally inwardly of the inner base member plane;
a movable member that supports a chain guide including a first pulley that rotates around a first pulley axis, wherein the first pulley has a pulley plane that is substantially perpendicular to the first pulley axis and bisects the first pulley; and
a first linking member coupled between the link coupling portion of the base member and the movable member so that the chain guide moves laterally relative to the base member between a first lateral position and a second lateral position;
wherein the pulley plane intersects the first linking member when the chain guide is located at a first position between the first lateral position and the second lateral position.

66. The derailleur according to claim 65 wherein the base member includes an outer casing coupler dimensioned to couple to an outer casing of a Bowden cable, wherein the outer casing coupler is positioned to be located rearward from the rotational axis.

67. The apparatus according to claim 66 wherein the base member includes a mounting surface for facing a bicycle frame, wherein the mounting surface faces laterally outward.

68. The derailleur according to claim 67 wherein the outer casing coupler is disposed laterally inward from the mounting surface.

69. The derailleur according to claim 68 wherein the outer casing coupler is dimensioned to terminate the outer casing of the Bowden cable.

70. The derailleur according to claim 69 wherein the outer casing coupler includes an outer casing receiving bore that has a bore axis, wherein the bore axis is inclined relative to a vertical plane from a laterally outer upper portion to a laterally inner lower portion.

71. The derailleur according to claim 67 further comprising a cable attachment member for directly attaching to an operating cable that moves to operate the derailleur, wherein the cable attachment member is disposed rearward from the rotational axis.

72. The derailleur according to claim 71 wherein the cable attachment member is disposed laterally inward from the mounting surface.

73. The derailleur according to claim 72 wherein the cable attachment member is disposed laterally inward from the mounting surface when the chain guide is located at a laterally outermost position.

74. The derailleur according to claim 67 wherein the outer casing coupler is dimensioned to terminate the outer casing of the Bowden cable, wherein the outer casing coupler is disposed at least partially laterally inward from the mounting surface, and further comprising a cable attachment member for directly attaching to an operating cable that moves to operate the derailleur, wherein the cable attachment member is disposed entirely rearward from the rotational axis and entirely laterally inward from the mounting surface.

75. The derailleur according to claim 65 wherein the chain guide includes a second pulley that rotates around a second pulley axis, wherein the first pulley is disposed above the second pulley, and wherein the first pulley axis is located at a range of from approximately 220° to approximately 270° in the Cartesian coordinate system when the chain guide is disposed in a laterally outermost position.

76. A method of mounting a bicycle rear derailleur having a base member, a movable member that supports a chain guide including a first pulley that rotates around a first pulley axis and a second pulley below the first pulley to rotate around a second pulley axis, wherein the first pulley has a pulley plane that is substantially perpendicular to the first pulley axis and bisects the first pulley, and a first linking member coupled between the base member and the movable member so that the chain guide moves laterally relative to the base member between a laterally outermost position and a laterally innermost position, wherein the pulley plane intersects the first linking member when the chain guide is located at a first position between the laterally outermost position and the laterally innermost position, wherein the method comprises the steps of:
provide the base member with a mounting portion and a link coupling portion, wherein the mounting portion has a laterally inwardly facing surface and a laterally outwardly facing surface opposite the laterally inwardly facing surface, wherein the laterally inwardly facing surface forms an inner base member plane, and wherein at least a portion of the link coupling portion is disposed laterally inwardly of the inner base member plane;
providing a continuous, one-piece bicycle frame end including:
a main body defining an axle receiving opening dimensioned to receive a bicycle wheel axle therein to rotate around a rotational axis, wherein the axle receiving opening includes an open end and a closed end, wherein the closed end is tangent to a horizontal axis of a Cartesian coordinate system at a common point when viewed along the rotational axis when the bicycle frame end is in an upright position of normal operation of the bicycle along a horizontal surface, wherein the common point forms the origin of the Cartesian coordinate system, and wherein the zero axis of the Cartesian coordinate system is the portion of the horizontal axis forward of the origin; and
a derailleur attachment structure located from approximately 180° to approximately 240° in the Cartesian coordinate system;
mounting the base member directly to the derailleur attachment structure so that the base member is located from approximately 180° to approximately 240° in the Cartesian coordinate system; and
positioning the movable member so that the first pulley axis is located at a range of from approximately 220° to approximately 270° in the Cartesian coordinate system when the chain guide is located at the laterally outermost position.

77. The method according to claim 76 wherein the step of mounting the base member further comprises the step of mounting the base member laterally inward of the derailleur attachment structure.

78. The method according to claim 77 further comprising the steps of:
positioning a terminating member for an outer casing of a Bowden cable on the base member at least partially laterally inward of the derailleur attachment structure; and
positioning an attachment structure for directly attaching an operating cable that moves to operate the derailleur, wherein the attachment structure is positioned entirely rearward of the rotational axis and entirely inward of the derailleur attachment structure.

79. The method according to claim 76 further comprising the step of positioning a terminating member for an outer casing of a Bowden cable on the base member rearward of the rotational axis.

80. The method according to claim 79 wherein the step of positioning the terminating member further comprises the step of positioning the terminating member laterally inward of the derailleur attachment structure.

81. The method according to claim 76 further comprising the step of positioning an attachment structure for directly attaching an operating cable that moves to operate the derailleur, wherein the attachment structure is positioned rearward of the rotational axis.

82. The method according to claim 81 wherein the step of positioning the attachment structure further comprises the step of positioning the attachment structure laterally inward of the derailleur attachment structure.

83. A bicycle rear assembly comprising:
a bicycle frame end including:
a main body defining an axle receiving opening dimensioned to receive a bicycle wheel axle therein to rotate around a rotational axis, wherein the axle receiving opening includes an open end and a closed end, wherein the closed end is tangent to a horizontal axis of a Cartesian coordinate system at a common point when viewed along the rotational axis when the bicycle frame end is in an upright position of normal operation of the bicycle along a horizontal surface, wherein the common point forms the origin of the Cartesian coordinate system, and wherein the zero axis of the Cartesian coordinate system is the portion of the horizontal axis forward of the origin; and a rear derailleur including:
- a base member consisting essentially of:
  - a boss member for supporting a pivot shaft about which the boss member pivots, wherein the boss member has a laterally inwardly facing surface and a laterally outwardly facing surface opposite the laterally inwardly facing surface, wherein the laterally inwardly facing surface forms an inner base member plane; and
  - a link coupling member, wherein at least a portion of the link coupling member is disposed laterally inwardly of the inner base member plane;
- an extension member having a first end portion and a second end portion, wherein the first end portion is structured for attachment to the bicycle frame end, and wherein the second end portion includes a derailleur attachment structure for attachment of at least one of the laterally inwardly facing surface or the laterally outwardly facing surface of the boss member and dimensioned so that, when the extension member is attached to the bicycle frame, the boss member is located from approximately 180° to approximately 240° in the Cartesian coordinate system;
- a movable member that supports a chain guide including a first pulley that rotates around a first pulley axis; and
- a first linking member coupled to the link coupling member and to the movable member so that the chain guide moves laterally relative to the base member between a first lateral position and a second lateral position.

84. A bicycle rear derailleur comprising:
a base member having a base member mounting opening for receiving a fastener therein for attaching the base member to a bicycle frame member;
a movable member that supports a chain guide including a first pulley that rotates around a first pulley axis, wherein the pulley has a pulley plane that is substantially perpendicular to the first pulley axis and bisects the pulley;
a first linking member pivotably coupled to the base member for pivoting around a first pivot axis and pivotably coupled to the movable member for pivoting around a second pivot axis so that the chain guide moves laterally relative to the base member between a first lateral position and a second lateral position;
a second linking member pivotably coupled to the base member for pivoting around a third pivot axis and pivotably coupled to the movable member for pivoting around a fourth pivot axis;
wherein, when the derailleur is viewed from the rear of the derailleur perpendicular to the first pulley axis and along the pulley plane such that the first pulley axis is horizontal and the pulley plane is vertical, and such that both the first pivot axis and the third pivot axis are disposed at their lowermost position relative to the base member mounting opening, at least one of the first pivot axis or the second pivot axis is vertically inclined relative to the pulley plane from a laterally inner upper location to a laterally outer lower location so that, when the derailleur is viewed from laterally outwardly of the derailleur along the first pulley axis such that the first pulley axis is disposed below and to the right of the base member, the first pulley is located in a laterally outward upper position when the chain guide is in the first position, and the first pulley is located in a laterally inward lower position when the chain guide is in the second lateral position; and
wherein the pulley plane intersects the first linking member when the chain guide is located at a first position between the first lateral position and the second lateral position.

85. The derailleur according to claim 84 wherein the first linking member is pivotably coupled to the base member through a first linking member pivot shaft, wherein the second linking member is pivotably coupled to the base member through a second linking member pivot shaft, and wherein, when the derailleur is viewed from the rear of the derailleur perpendicular to the first pulley axis and along the pulley plane such that the first pulley axis is horizontal and the pulley plane is vertical, and such that both the first linking member pivot shaft and the second linking member pivot shaft are disposed at their lowermost position relative to the base member mounting opening, at least one of the first linking member pivot shaft or the second linking member pivot shaft is vertically inclined relative to the pulley plane from a laterally inner upper location to a laterally outer lower location.

* * * * *